LEGENDS:
① CHILLER INPUT VARIABLE MANIPULATED RESPONSIVE TO SLURRY TEMPERATURE.
② CHILLER INPUT VARIABLE MANIPULATED RESPONSIVE TO SLURRY TEMPERATURE.
③ CONSTANT CONCENTRATION OF SOLIDS

INVENTOR.
J.E. COTTLE
BY Young + Quigg
ATTORNEYS

United States Patent Office 3,255,598
Patented June 14, 1966

3,255,598
CRYSTAL FORMING PROCESS
John E. Cottle, Bartlesville, Okla., assignor to Phillips Petroleum Company, a corporation of Delaware
Filed Feb. 8, 1963, Ser. No. 257,289
8 Claims. (Cl. 62—58)

This invention relates to a method of and apparatus for separating liquid multi-component mixtures by crystallization. In another aspect, this invention relates to an improved method of and apparatus for separating a component of low concentration from a liquid multi-component mixture by crystallization.

The separation of chemical compounds by means of crystallization finds many applications in industrial installations. While separation by distillation or solvent extraction seems to be generally preferred, there are cases when these methods are impractical or impossible and the desired separation can be effected only by means of crystallization. Thus when confronted with chemical isomers having similar boiling points and solubilities, or with materials having relatively high boiling points, or with thermally unstable substances, or with solutions containing both volatile and non-volatile impurities, or undesired constituents, separation by crystallization may be the only method which can be advantageously employed.

Conventionally, for example, aqueous solutions can be concentrated by crystallization involving chilling the aqueous solution to form ice crystals with subsequent separation of the ice crystals from the mother liquor. This method as applied to the concentration of food products has become commercially acceptable for reasons that it can be carried out without damaging the taste of the food product. In this respect, concentration by crystallization represents a considerable improvement over, for example, evaporative processes which rely upon heat and/or extremely low pressures. The removal of water by evaporation also results in the removal of much of the essential oils and esters, many of which are not recoverable, so that the concentrated product can never be restored to its original freshness and flavor. Concentration by crystallization can be employed to advantage in the processing of such food products and beverages as milk, fruit juices, vegetable juices, vinegar, beer, wine, liquors and the like. As applied to beer, the process has the additional advantage of serving as an accelerated lagering process, thereby reducing the requirement for large refrigerated storage tanks in breweries.

As previously noted, crystallization processes conventionally comprise a chilling step followed by the separation of the formed crystals from the mother liquor. The chilling step comprises lowering the temperature of the feed in a chilling zone until the crystals are formed. While it would be desirable to concentrate as much as possible of the crystallizable component in the chilling zone by the formation of crystal solids, if the solids content is too high the resulting slurry becomes quite stiff and difficult to transmit from the chilling zone. It has been found desirable that the slurry passed from the chilling zone comprise from about 20 to 60 and preferably about 35 to 55 weight percent solids.

Control of the chilling zone conventionally comprises controlling the temperature of the slurry passed from the chilling zone as the temperature of the slurry is representative of the concentration of solids present therein. It is highly desirable that the concentration of solids in the slurry passed from the chilling zone to the purification or separation step be substantially constant so as to provide a proper basis for control of the separation or purification step. The effect of varying the concentration of the solids to the purification step will hereinafter be discussed.

In beer, fruit juices, and other aqueous systems, the concentration of crystallizable component (water) is high and the concentration of recoverable product to be separated as mother liquor is relatively low. A slight change in the temperature of the slurry passed from the chilling zone represents a substantial change in the solids content of the slurry. Therefore, a control system based upon measuring a temperature representative of the percent solids in the slurry and manipulating the flow of coolant to the chilling zone, or otherwise adjusting the temperature of the chilling zone, in a conventional feedback method of control is highly unsatisfactory. With an aqueous feed to the chilling zone, the concentration of solids in the slurry passed from the chilling zone varies widely.

I have discovered that the concentration of solids in the slurry feed to the separation step can be controlled by chilling a portion of the mother liquor recovered from the separation or purification step in a second chilling zone and combining the slurry passed from the second chilling zone with the slurry from a first chilling zone wherein the feed to the crystallization process is chilled, and passing the combined slurries to the separation step.

Accordingly, an object of my invention is to provide an improved crystallization process.

Another object of my invention is to provide an improved process for the concentration of a component of low concentration.

Another object of my invention is to provide an improved process for concentrating aqueous solutions by crystallization.

Other objects, advantages and features of my invention will be readily apparent to those skilled in the art from the following description and the appended claims.

The invention is particularly applicable to the concentration by crystallization of aqueous solutions such as fruit juices, vegetable juices, wine, beer, milk and the like, but it is not intended that the invention should be limited thereto. The invention is also applicable to separation by crystallization processes generally, and particularly applicable to crystallization processes wherein a slight change in the temperature of the chilling zone produces a substantial change in the solids content of the slurry passed from the chilling zone.

Figure 1:
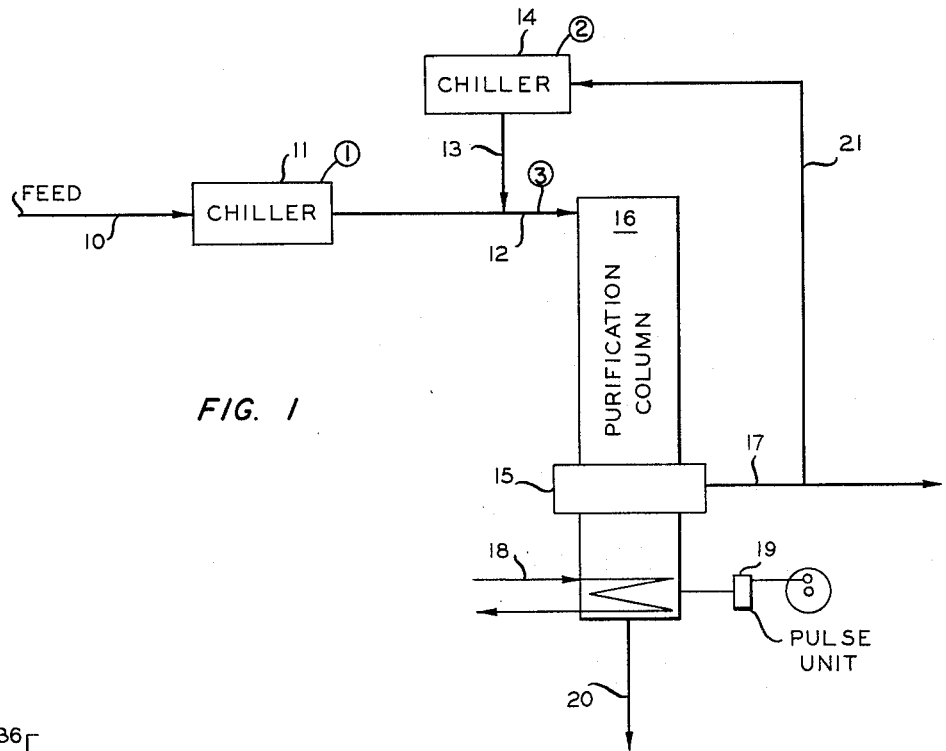
FIGURE 1 is a schematic representation of one embodiment of the inventive process.

Referring to FIGURE 1, the inventive process will be described as applied to the concentration of beer by crystallization. It is not intended, however, that the invention should be limited thereto. Beer comprising, for example, about 3.6 weight percent alcohol, 5.5 weight percent sugars and 90.9 weight percent water is passed via conduit means 10 to chiller 11 wherein the temperature of the beer feed is lowered so as to produce a slurry containing ice crystals. Chiller 11 can comprise any conventional apparatus wherein the temperature of the feed can be lowered so as to produce a slurry of crystals and a means for passing the said slurry of crystals therefrom. Conventional chilling apparatus comprises a jacketed vessel equipped with a rotary scraper with a cooling medium passed through the jacket in indirect heat exchange with the feed to the chiller. Within chiller 11, water is crystallized to form a crystal slurry which contains from about 10 to 55, and preferably about 15 to 45 weight percent solids. As previously noted, while it is desirable to concentrate to as high a degree as possible the formation of crystal solids, if the solids content is too high the slurry becomes quite stiff and becomes too difficult to pass from the chiller.

Figure 2:
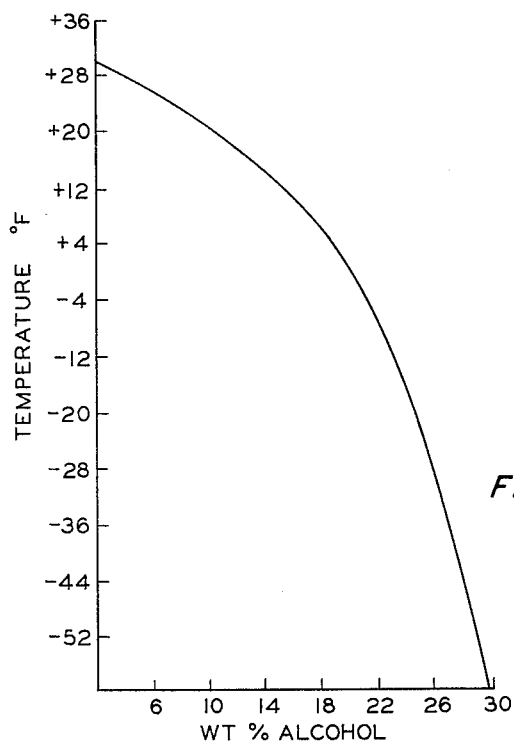
FIGURE 2 is a schematic representation of the freeze point curve for beer.

Referring to FIGURE 2, the freezing point curve for beer is therein illustrated. The temperature at which crystals in, for example, a beer feed having a concentration of 3.6 weight percent alcohol will begin to form on chilling is 28.6° F. At 26° F. a slurry comprising 40 weight percent solids will have formed. By varying the final chilling temperature (the temperature of the slurry passed from the chiller) by only ½ degree, the solids content is changed 4.5 weight percent. If, for example, it is desired to maintain a slurry having a solids content of 40 weight percent, for effective operation of this purification or separation step the solids content of the slurry should range from 38 to 42, preferably 39 to 41 weight percent solids. It can, therefore, be readily seen that in order to effectively control chiller 11 to produce a slurry having a substantially constant concentration of crystals, the temperature of the slurry passed from chiller 11 cannot vary more than 0.2° F. from the desired temperature. It is not feasible to attempt to control the final chilling temperature within 0.2° F. of the desired final chilling temperature by conventional temperature control methods.

The slurry of ice crystals passed from chiller 11 via conduit means 12 is combined with a slurry of ice crystals from a source hereinafter described to provide a slurry wherein the concentration of solids is in the previously stated desired range of from about 20 to 60 and preferably about 35 to 55 weight percent and passed to conduit means 12 via conduit means 13. A combined slurry feed having a substantially constant percent solids concentration is passed to purification column 16.

Purification column 16 can be a piston-type column or a pulse-type column as described in the patent to R. W. Thomas, 2,854,494. As illustrated, crystal purification column 16 is a pulse-type column having a pulse unit 19. In either type of column, a compacted mass of crystals is forced through the column and into a body of melt at the downstream end thereof. The body of melt is formed by melting the crystals through the introduction of heat via heating means 18, such as heating coils. The passage of the melt from the purification column 16 is restricted so that some of the melt is passed into the crystal mass as the crystals are passed through the column into the body of melt.

A filter section 15 is provided in an intermediate region in purification column 16 so that mother liquor containing about 18 weight per cent alcohol can be withdrawn from the column via conduit means 17 and thereby separated from the crystals. The melt comprising water is withdrawn from purification column 16 via conduit means 20.

Although a purification column has herein been illustrated, it is also within the scope of this invention to employ other means of effecting a separation of the mother liquor from the crystals such as a conventional centrifuge. The invention is not limited to a particular method of effecting a separation of the mother liquor and crystals, but is applicable to any crystallization process wherein it is desired to produce a crystal slurry of substantially constant or controlled crystal concentration.

Those skilled in the art recognize that efficient operation of the separation or purification column is dependent upon the percent solids concentration of the slurry passed to the purification step and the temperature of the slurry feed to the purification step. As the solids concentration is directly related to the temperature of the slurry, maintaining the concentration of solids substantially constant also results in maintaining the temperature of the slurry feed to the purification step substantially constant.

At least a portion of the mother liquor (beer concentrate) withdrawn from purification column 16 via conduit means 17 is recycled or passed to chiller 14 via conduit means 21. Chiller 14 can comprise apparatus such as described in connection with chiller 11.

Referring again to FIGURE 2, it can be seen that wherein, for example, a beer feed to a chilling zone comprising 18 weight percent alcohol, crystals will begin to form at 6.3° F. Continuing to chill the feed to −60° F. will produce a slurry comprising 40 weight percent solids. This represents a temperature difference of 66.3° F. between the temperature at which the crystals are first formed and the point at which the resulting slurry comprises 40 weight percent solids. As the mother liquor recycle stream to chiller 14 contains a relatively low concentration of crystallizable component (water), it can readily be seen that the concentration of solids in the slurry passed from chiller 14 via conduit means 13 can be substantially more effectively controlled than the solids content of the slurry passed from chiller 11. A 1° change in the temperature of the slurry passed from chiller 14 produces less than 0.3 weight percent solids concentration change in the slurry.

The slurry passed from chiller 14 via conduit means 13 has a solids content ranging from 40 to 60 weight percent, preferably about 45 to 55 weight percent. The slurry passed from chiller 14 is combined with the slurry passed from chiller 11 in the heretofore described manner with the ratio of the slurry from chiller 14 to the slurry from chiller 11 preferably ranging from 0.5:1 to 5:1 on a weight basis.

By, for example, combining the slurry from chiller 14 and the slurry from chiller 11 in the weight ratio of 1:1, the weight percent solids concentration deviation from the desired control level of the slurry from chiller 11 passed to purification column 16 is reduced by nearly one-half. This is to say that should the temperature of the slurry passed from chiller 11 deviate one-half degree from the desired control level, producing a deviation of 4.5 weight percent solids concentration, the combined slurries will deviate only less than 2.55 weight percent solids concentration from the desired control level by controlling the temperature of the slurry passed from chiller 14 within 1 degree of the desired control temperature.

As will be evident to those skilled in the art, various modifications of this invention can be made, or followed, in the light of the foregoing disclosure and discussion without departing from the spirit or scope thereof.

I claim:

1. In a process which comprises passing a liquid multi-component mixture containing a crystallizable component to a first chilling zone, forming a first slurry of crystals of said crystallizable component in mother liquor within said first chilling zone, measuring the temperature of the resultant formed slurry, manipulating an input process variable of said first chilling zone responsive to said temperature measurement, passing said formed slurry from said first chilling zone to a separation zone, and separating said crystals from said mother liquor in said separation zone; the improvement which comprises passing a portion of said mother liquor separated from said crystals in said separation zone to a second chilling zone, forming a second slurry of crystals in mother liquor within said second chilling zone, measuring the temperature of the resultant slurry formed in said second chilling zone, manipulating an input process variable of said second chilling zone responsive to said temperature measurement of said second slurry, combining said first slurry with said second slurry, said second slurry containing a substantially lower concentration of said crystallizable component than the concentration of said crystallizable component in said first slurry, and passing the resultant combined slurry to said separation zone, said resultant combined slurry having a substantially constant concentration of solids.

2. The process of claim 1 wherein the concentration of solids in said first slurry is in the range of 10–55 weight percent and the concentration of solids in said second slurry is in the range of 40–60 weight percent.

3. The process of claim 2 wherein the weight ratio of said second slurry to said first slurry passed to said separation zone is in the range of 0.5:1 to 5:1.

4. The process of claim 3 wherein said liquid multi-component mixture comprises an aqueous solution.

5. In a process which comprises passing an aqueous solution to a first chilling zone, forming a first slurry of ice crystals in mother liquor within said first chilling zone, measuring the temperature of the resultant formed slurry, manipulating an input process variable of said first chilling zone responsive to said temperature measurement, passing said formed slurry from said first chilling zone to a separation zone, separating said crystals from said mother liquor in said separation zone, passing the resultant separated ice crystals into a confined zone wherein said ice crystals are passed in a contact mass into a body of crystal melt formed by melting said ice crystals in a downstream portion of said confined zone, and withdrawing the resultant separated mother liquor from said separation zone; the improvement which comprises passing a portion of said mother liquor withdrawn from said separation zone to a second chilling zone, forming a second slurry of ice crystals in mother liquor within said second chilling zone, measuring the temperature of the resultant slurry formed in said second chilling zone, manipulating an input process variable of said second chilling zone responsive to said temperature measurement of said second slurry, combining said first slurry with said second slurry, said second slurry containing a substantially lower concentration of water than the concentration of water in said first slurry, and passing the resultant combined slurry to said separation zone, said resultant combined slurry having a substantially constant concentration of ice crystals.

6. The process of claim 5 wherein the concentration of ice crystals in said first slurry is in the range of 10–55 weight percent and the concentration of ice crystals in said second slurry is 40–60 weight percent.

7. The process of claim 6 wherein the weight ratio of said second slurry to said first slurry passed to said separation zone is in the range of 0.5:1 to 5:1 on a weight basis.

8. The process of claim 7 wherein said aqueous solution is beer.

References Cited by the Examiner

UNITED STATES PATENTS

| | | | |
|---|---|---|---|
| 2,735,779 | 2/1956 | Wenzelberger | 62—58 X |
| 2,895,835 | 7/1959 | Findlay. | |
| 3,050,953 | 8/1962 | Wilson | 62—58 |

FOREIGN PATENTS 217,766 10/1958 Australia.

NORMAN YUDKOFF, *Primary Examiner.*